United States Patent [19]

Dupuy

[11] Patent Number: 5,430,774
[45] Date of Patent: Jul. 4, 1995

[54] DATA TRANSMISSION METHOD AND BASE TRANSCEIVER STATION USING THIS METHOD

[75] Inventor: Pierre Dupuy, Paris, France

[73] Assignee: Alcatel N.V., Amsterdam, Netherlands

[21] Appl. No.: 159,263

[22] Filed: Nov. 30, 1993

[30] Foreign Application Priority Data

Nov. 30, 1992 [FR] France .................. 92 14370

[51] Int. Cl.$^6$ .................. H04B 7/26; H04L 29/06
[52] U.S. Cl. .................. 375/240; 375/368; 370/105.1; 370/108; 341/87; 455/54.1
[58] Field of Search .................. 375/37, 112, 116, 122; 370/82-83, 101-102, 110.1, 105.1, 108; 341/60, 87; 381/29, 31; 455/51.1, 51.2, 54.1

[56] References Cited

U.S. PATENT DOCUMENTS 4,470,141 9/1984 Takada .................. 370/105.1
4,984,238 1/1991 Watanabe et al. .................. 370/105.1

FOREIGN PATENT DOCUMENTS 2078768 9/1991 Canada .

OTHER PUBLICATIONS

A. Carrie et al, "Matracom 9200 Et Axe 10: Un Systeme flexible pour les reseaux GSM", *Commutaion and Transmission*, vol. 13, No. 1, 1991, pp. 5–18.

*Primary Examiner*—Young Tse
*Attorney, Agent, or Firm*—Sughrue, Mion, Zinn, Macpeak & Seas

[57] ABSTRACT

A method of transmitting data from a base transceiver station or base station to a transcoder. Prior to transmission to the base station, the data is organized in streams of frames (T1, T2, T3). The streams are assembled into groups (G1, G2, G3), and the transmission of the data to the base station starts at the start of a stream of frames (T1, T2, T3). The method includes the following operations: after activation of a channel of the base station for reception of the data frames, the first stream of frames (T1, T2, T3) received on the channel by the base station is associated with a reference number within the corresponding group of frames (G1, G2, G3); and transmission of data by the base station to the transcoder is then delayed by an amount ($R_i$, $R_j$) depending on the reference number and the group of frames of the first stream of frames, whereby a continuous stream of data (A1, A2, A3) is transmitted by the base station to the transcoder.

2 Claims, 3 Drawing Sheets

COMMUNICATION SYSTEM

DATA TRANSMISSION METHOD AND BASE TRANSCEIVER STATION USING THIS METHOD

BACKGROUND OF THE INVENTION

The present invention concerns a method of transmitting data. It is also directed to a base transceiver station using this method.

In the field of digital mobile radio, the speech or other data transmitted by a mobile station is received by a fixed base transceiver station (or base station). The data signalling rate of the data transmitted by radio, i.e. "on air", is lower than that of data transmitted "by wire" in the various fixed units of the radio system (for example, speech is transmitted on air at the full data signalling rate of 13 kbit/s and data is transmitted at 12, 6 or 3.6 kbit/s while the data signalling rate by wire is 64 kbit/s). Consequently, a transcoder (referred to in the GSM standard as a TRAU: Transcoder/Rate Adaptor Unit) is used to adapt the data signalling rate of the data transmitted on air to that of the data transmitted by wire.

Data is usually transmitted by a mobile station to a base station in the form of streams of frames. After a traffic channel designed to convey speech or data is activated for the exchange of data between the base station, and a mobile station the transmission of the first streams of data frames from the mobile station to the base station may give rise to an offset relative to that corresponding to steady-state conditions.

This phenomenon is illustrated in the example shown in FIG. 1, which is a timing diagram indicating the organization under the GSM standard of the streams of TA data frames (air frames) as prepared by the mobile station for transmission to the base station and that of corresponding processed data frames TRAU transmitted by the base station to the transcoder.

The (speech or other) data frames to be transmitted at the full data signalling rate by the mobile stations in systems to the GSM standard are initially arranged in groups G1, G2, G3, each comprising a stream of five frames T1 followed by two streams of four frames T2 and T3, these groups of 13 frames being repeated periodically to constitute multiframes M1, M2 each comprising 26 frames (this is in systems to the GSM standard). These groups are shown in FIG. 1 in which rectangles symbolically represent the streams of frames T1, T2, T3, the number of frames in each stream being shown in the respective rectangle.

The mobile station transmits these streams of frames in the form of a continuous sequence of frames (not shown) after interleaving, i.e. after combination of R1 through R7 type sequences each comprising two consecutive frame streams and consequently eight or nine frames in the case of speech data (the interleaving may be different for data other than speech data), two consecutive sequences of the set R1 through R7 overlapping over a frame stream length.

At the start of transmission, i.e. after activation of a transmission channel between the mobile station and the base station, the mobile station can begin to transmit only at the start of a T1, T2 or T3 type stream. To this end its internal clock is synchronized to that of the base station.

If the mobile station were to begin to transmit at any other time, the base station would not be able to reconstitute from the data received the initial streams of frames as present at the mobile station before interleaving and would therefore be incapable of using the data transmitted.

From the streams of frames received from the mobile station, the base station reconstitutes the initial structure with the initial frame groups G1, G2, G3 and in turn transmits this data to the transcoder in 20 ms packets constituting so-called TRAU frames, starting at the end of reception of a first sequence of eight or nine frames after activation of the channel (20 ms is the duration of the data packets used in wire networks).

In the GSM standard, a time period of 20 ms is equivalent to the duration of four and one-third frames. Thus one of the following three situations is encountered at the start of transmission:

if the first TA frame received and identified (i.e. recognized after reconstitution of the original structure) by the base station after activation of an on air receive channel belongs to an R1, R4 or R7 type sequence, or more generally an $R(3n+1)$ type sequence, i.e. if it is the first frame of a T1 stream, a stream of S1 type TRAU frames is transmitted by the base station to the transcoder and there is no "gap" in transmission;

if the first TA frame received and identified after activation belongs to an R2 or R5 type sequence, or more generally an $R(3n+2)$ type sequence, i.e. if it is the first frame of a T2 stream, a train of S2 type TRAU frames is transmitted by the base station to the transcoder and a one-third frame "gap" $T_{\frac{1}{3}}$ appears between the third and fourth frames during which the base station does not transmit any usable data to the transcoder;

if the first TA frame received and identified after activation belongs to an R3 or R6 type sequence, or more generally an $R(3n+3)$ type sequence, i.e. if it is the first frame of a T3 stream, a stream of S3 type TRAU frames is transmitted by the base station and a two-thirds frame "gap" $T_{\frac{2}{3}}$ appears between the third and fourth frames.

This phenomenon is due to the fact that the data frames are not necessarily transmitted on air by the mobile stations immediately after the activation of a receive channel and in systems to the GSM standard this results in practice in an absence of data transmitted to the transcoder for 1.5 or 3 ms.

It is evident that this phenomenon occurs only at the start of transmission and that after some particular time (60 ms in the FIG. 1 example) the transmission "gaps" are eliminated.

If the data transmitted is speech data the presence of these "gaps" in the initial transmission increases the time needed to synchronize the transcoder with the base station. During this time either the speech is unintelligible or extrapolation is required. This is naturally highly undesirable. Exactly the same problem arises in full signalling rate or half-rate transmission of speech data.

If the data transmitted is non-speech data, the GSM standard prohibits transmission of data to the transcoder during "gaps" in reception from the mobile stations; one known solution to this problem is to insert stuffing frames (comprising series of 1 s, for example) pending the next frame, which results in an additional time-delay of 17 to 20 ms. Although this solution is of little advantage in full data signalling rate transmission, because of the penalty in terms of transmission time-delays, it is totally unthinkable in half-rate transmission, especially in the case of data other than speech data, in respect of which the base station transmits to the transcoder packets having a duration of 40 ms rather than 20 ms. In the case of an R(3+n3) type sequence, a "gap" would then occur in the middle of a packet of data; stuffing is not feasible in this case because the stuffing bits occurring in the middle of the packets would be taken as data bits.

The same problem could arise in the case of half-rate speech transmission in which case speech packets of greater than 20 ms duration would be sent by the base station.

SUMMARY OF THE INVENTION

An object of the invention is to remedy the drawbacks of prior art methods of transmitting data to a transcoder by proposing a method for transmitting data frames to a transcoder which enables the transcoder synchronization time to be reduced, the insertion of additional time-delays into the transmission to be avoided, and the problem of transmission "gaps" occurring in the middle of a packet of data transmitted to the transcoder by the base station to be eliminated where the duration of the packet is greater than that of packets used in wire networks.

To this end the present invention proposes a method of transmitting data from a base transceiver station or base station to a transcoder, said data, initially transmitted to said base station, being, prior to its transmission to said transcoder, organized in frames assembled in streams, each stream including at least one frame, said streams being in turn assembled into groups. The transmission of said data to said base station starts at the start of a stream of frames.

The method it comprises the following operations:
after activation of a channel of the base station for reception of said data frames, the first stream of frames received on said channel by said base station is associated with a reference number within the corresponding group of frames,
transmission of data by said base station to said transcoder is then delayed by an amount depending on the reference number in said group of frames of said first stream of frames, whereby a continuous stream of data is transmitted by said base station to said transcoder.

Thus using the method in accordance with the invention the synchronization problem mentioned above cannot occur. As soon as the base station begins to transmit it sends a continuous stream of data to the transcoder; this stream must be modified only if the base station clocks drift relative to that of an interface between said base station and a base station controller.

This minimizes the initial synchronization procedures carried out by the transcoder, which yields improved speech quality in the case of starting up the transcoder after a mobile station access procedure or after a handover. This solves the problem associated with transmission of speech data using the prior art methods.

Thanks to the invention, when the data is transmitted at the full data signalling rate the transmission of a continuous stream avoids the need to use stuffing bits and prevents the introduction of additional transmission time-delay; in the case of half-rate transmission, the packets transmitted by the base station to the transcoder being usually longer than packets used in wire networks, transmitting a continuous stream of data solves the problem of the "gap" occurring in the middle of a packet.

A base transceiver station or base station for implementing the method according to the invention comprises receive means for receiving data, means for identifying said streams of frames from said data and connected to the transcoder via digital interface means, and is characterised in that it further comprises means for delaying the transmission of data to said transcoder by a time-delay depending on a reference number corresponding to said first stream of frames identified from the data received after activation of a receive channel at said base transceiver station.

Other features and advantages of the present invention will emerge from the following description.

DESCRIPTION OF THE PREFERRED EMBODIMENTS

Elements common to all the figures carry the same reference numbers.

Figure 1:
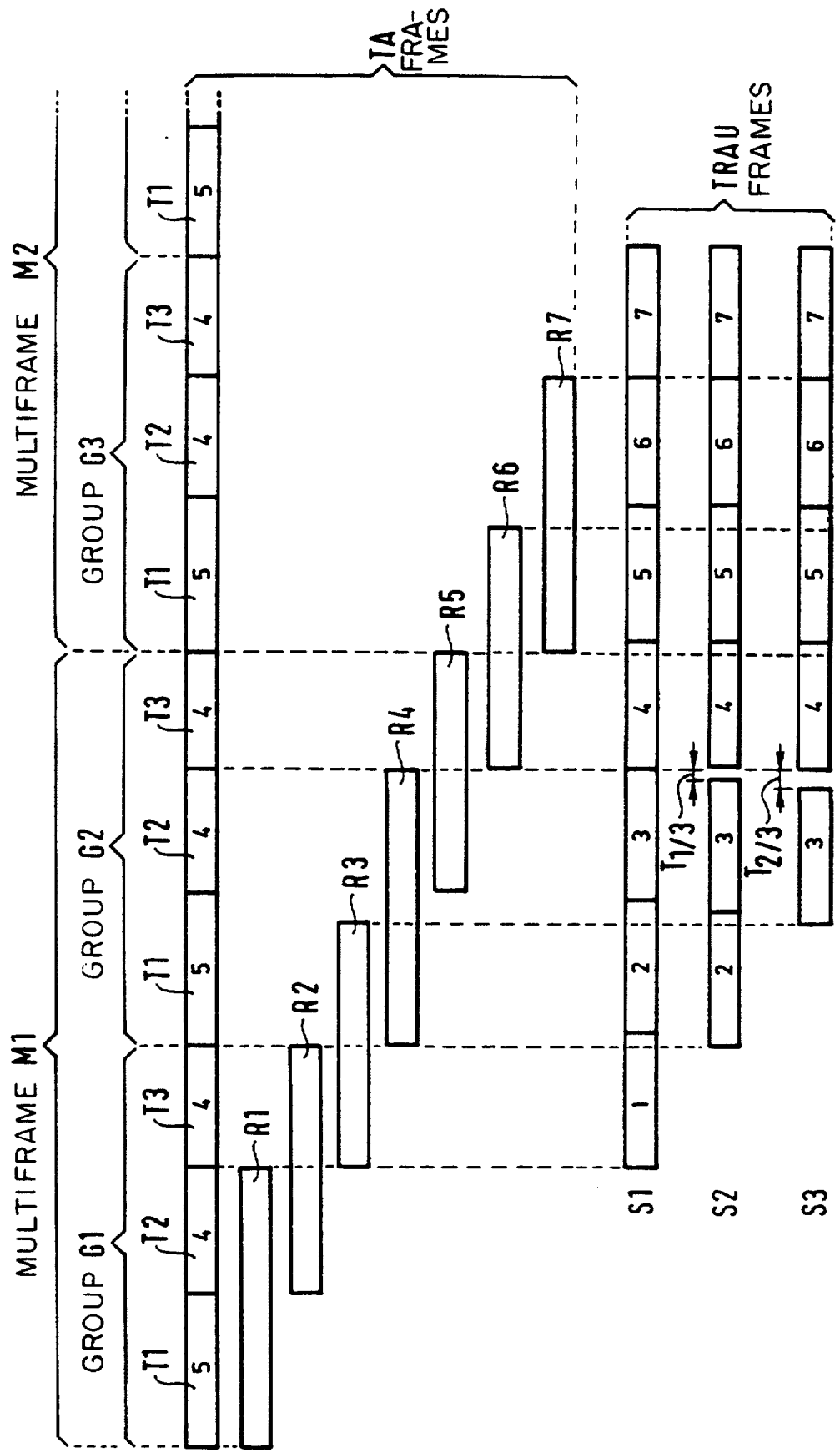
FIG. 1 is a timing diagram showing the organization of data frames as prepared by a mobile station for transmission to a base station and the organization of data transmitted to a transcoder after processing by the base station using a prior art method.

FIG. 1 was described in the explanation of the prior art.

The "gaps" $T_i$ and $T_j$ present in the prior art transmission situations S2 and S3 (see FIG. 1) are eliminated with the transmission method in accordance with the invention. The corresponding time-delays are in effect transferred to the start of transmission in the form of initial time-delays depending on the rank in the respective frame group of the first stream of frames identified by the base station from data received after activation of a receive channel.

Figure 2:
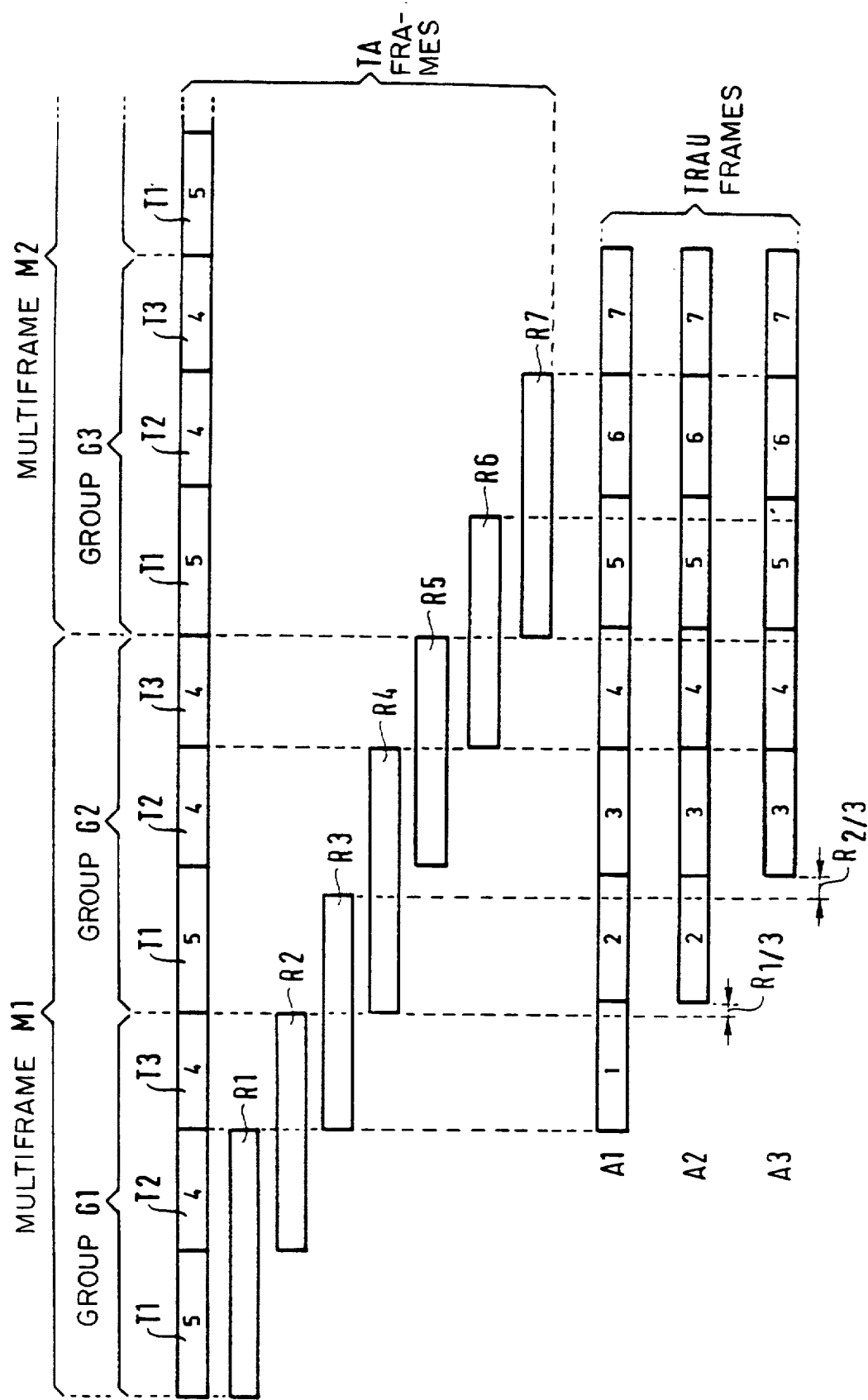
FIG. 2 is a timing diagram showing the organization of data frames as prepared by a mobile station for transmission to a base station and the organization of data transmitted to a transcoder after processing by the base station using the method of the invention.

With reference to all of the streams of TRAU frames A1 through A3 shown in FIG. 2, respectively corresponding to the streams S1 through S3 in FIG. 1, the following situations arise with the method in accordance with the invention:
if the first TA frame received and identified after activation belongs to an R1, R4, ..., R(3n+1) type sequence (where n is a null or positive integer), i.e. if the first stream of frames received and identified is a T1 type stream, the base station transmits to the transcoder a stream of A1 type TRAU frames with no initial time-delay,
if the first TA frame received and identified after activation belongs to an R2, R5, ..., R(3n+2) type sequence, i.e. if the first stream of frames received and identified is a T2 type stream, the base station transmits a stream of A2 type TRAU frames with an initial one-third frame time-delay $R_\frac{1}{3}$, if the first TA frame received and identified after activation belongs to an R3, R6, ..., R(3n+3) type sequence, i.e. if the first stream of frames received and identified is a T3 type stream, the base station transmits a stream of A3 type TRAU frames with an initial two-thirds frame time-delay $R_j$.

Note that:

the base station identifies the first stream of frames received after processing the data received in order to reconstitute the initial structure with the groups of frames organized by the mobile station before interleaving, the base station is able to determine, after receiving data transmitted by the mobile station and reconstituting the initial structure before interleaving, with which stream of frames (T1, T2 or T3) transmission from the mobile station began, i.e. it can determine the rank of the first stream of frames within the corresponding group of frames because its internal clock is synchronized to that of the mobile station.

With the method in accordance with the invention, in the example shown, there is therefore obtained a set of possible TRAU data frames A1, A2, A3 for transmission by the base station to the transcoder, the respective time-delays for these streams of data being zero, one-third frame and two-thirds frame, depending on the rank of the first stream of frames received after activation. There is no interruption to the sequence of data transmitted to the transcoder, which is therefore a continuous stream of data.

Figure 3:
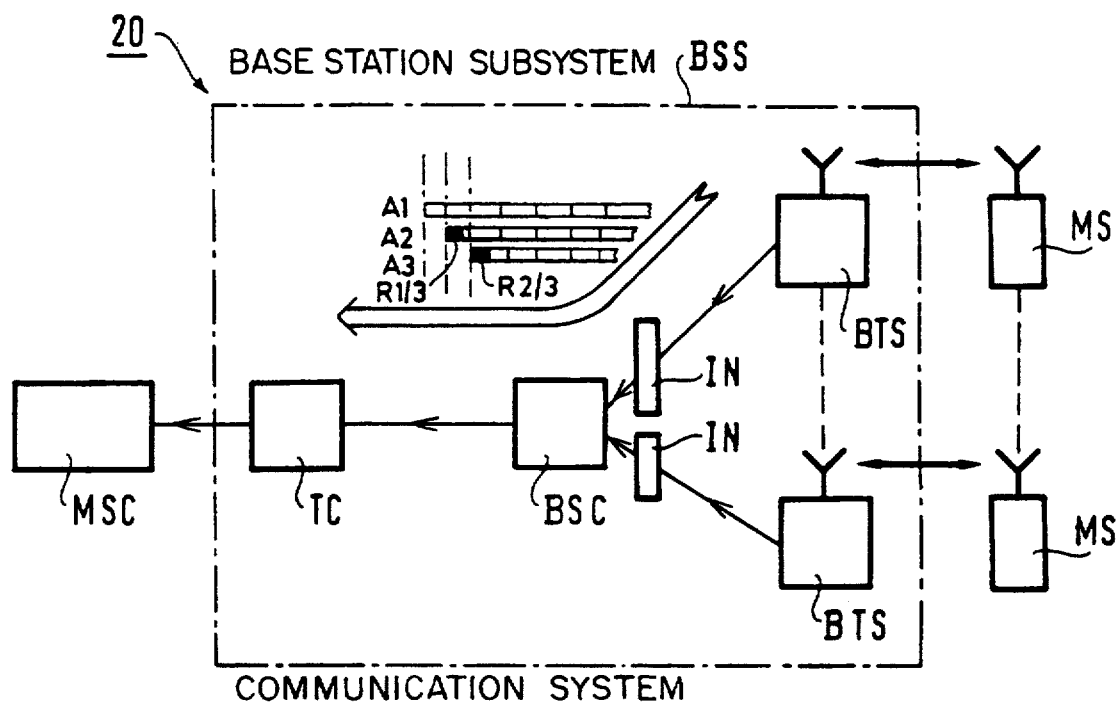
FIG. 3 is a block diagram showing a mobile radio system comprising base transceiver stations using the method in accordance with the invention.

The method in accordance with the invention for transmitting frames can advantageously be used in a communication system 20 of the type shown in highly schematic form in FIG. 3. This system includes base transceiver stations BTS transmitting data to a transcoder TC, the base stations BTS and the transcoder TC belonging to a base station subsystem BSS associated on the input side with a mobile services switching center MSC via high data signalling rate digital links (64 kbit/s links, for example) and on the output side with a set of mobile stations MS via radio links.

Figure 4:
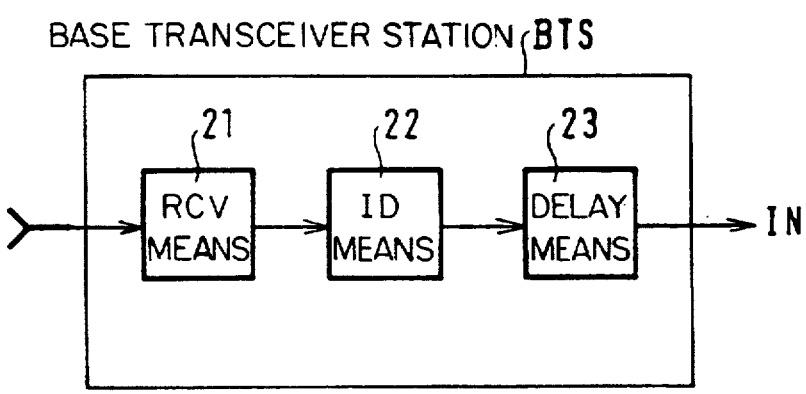
FIG. 4 shows in detail the means included in a base station in accordance with the invention as shown in FIG. 3 and used to implement the method in accordance with the invention, other conventional means present in a base station not being shown in this figure.

In more detail, a base station BTS includes receive means 21 (see FIG. 4) for receiving data transmitted by the mobile stations MS, means 22 for identifying the streams of frames from the data received by the receive means 21, and means 23 for delaying the transmission of data to the transcoder TC by an amount depending on a reference number corresponding to the first stream of frames identified from the data received after activation of a receive channel.

Data is transferred from a base station BTS to a transcoder TC via a base station controller BSC which controls a plurality of stations via digital communication interfaces IN for example at a data signalling rate of 13 kbit/s (full-rate) or 6.5 kbit/s (half-rate).

Of course, the invention is not limited to the examples that have just been described and numerous modifications may be made to these examples without departing from the scope of the invention.

For example, the method in accordance with the invention may be applied in digital radio systems other than those conforming to the GSM standard referred to in this description.

Also, the method of the invention applies to the transmission of data of any kind (speech or otherwise), at the full data signalling rate or at half this rate.

For application of the method in accordance with the invention it is not necessary for the mobile station to interleave frames before transmitting them.

Nor is it necessary for the frames to be grouped as described, which corresponds to the specific example of the GSM system. For example, the expression "stream of frames" refers generally to a set of frames, this set containing at least one frame.

Finally any means may be replaced by equivalent means without departing from the scope of the invention.

What is claimed is:

1. A method of transmitting data from a base station to a transcoder, said data being initially received by said base station and being organized in frames assembled in streams, (T1, T2, T3) each of said streams including at least one frame and being assembled in turn into groups (G1, G2, G3), the reception of said data by said base station starting at the start of a stream of frames (T1, T2, T3), wherein the method comprises the steps of:

activating a channel of the base station for reception of said data frames;

associating a first stream of frames (T1, T2, T3) received on said channel by said base station with a reference number indicating a rank of said first stream of frames (T1, T2, T3) within a corresponding group (G1, G2, G3);

delaying the start of the transmission of data from said base station to said transcoder by an amount ($R_i$, $R_j$), depending on the reference number; and transmitting a continuous stream of data (A1, A2, A3) from said base station to said transcoder.

2. The base station for implementing the method according to claim 1, comprising: receive means (21) for receiving data; means (22) for identifying said streams of frames from said data; and means (23) for delaying the transmission of data to said transcoder (TC) by a time-delay depending on the reference number corresponding to said first stream of frames (T1, T2, T3) identified from the data received after activation of the receive channel at said base station, wherein said base station is connected to the transcoder (TC) via digital interface means.

* * * * *